No. 735,373. PATENTED AUG. 4, 1903.
C. L. HENDERSON.
VEHICLE TIRE.
APPLICATION FILED OCT. 20, 1902.
NO MODEL.

Witnesses. Inventor.
C. L. Henderson.

No. 735,373.

Patented August 4, 1903.

UNITED STATES PATENT OFFICE.

CHARLES LEWIS HENDERSON, OF BERLIN, CANADA.

VEHICLE-TIRE.

SPECIFICATION forming part of Letters Patent No. 735,373, dated August 4, 1903.

Application filed October 20, 1902. Serial No. 128,007. (No model.)

*To all whom it may concern:*

Be it known that I, CHARLES LEWIS HENDERSON, machinist, of the town of Berlin, in the county of Waterloo, in the Province of Ontario, Canada, have invented certain new and useful Improvements in Vehicle-Tires, of which the following is a specification.

My invention relates to improvements in vehicle-tires; and the object of the invention is to produce a durable and smooth-riding tire particularly adaptable for automobiles, which will be extremely strong and at the same time of a maximum resiliency, such as will not be liable to be affected by obstructions, as are the tires at present in use, and a secondary object is to dispense with the air-tire; and it consists, essentially, of a substantially U-shaped rim, a tread fitting between the upper edges of the rim and extending circumferentially around the rim, a plurality of cross-partitions extending around the rim between the walls thereof and provided with end rollers to run on the guideways on the walls, and thereby provide for freedom of movement of the cups, and a plurality of springs, one fitting within the other and each extending between the base of the rim and the base of the cup, the parts being otherwise arranged and constructed in detail as hereinafter more particularly explained.

Figure 1:
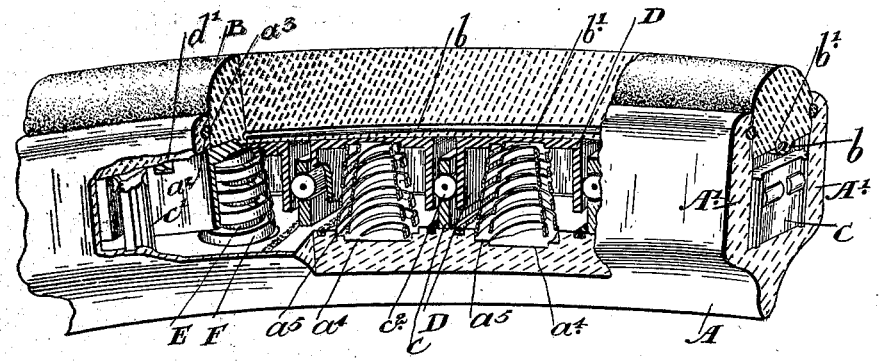
Figure 2:
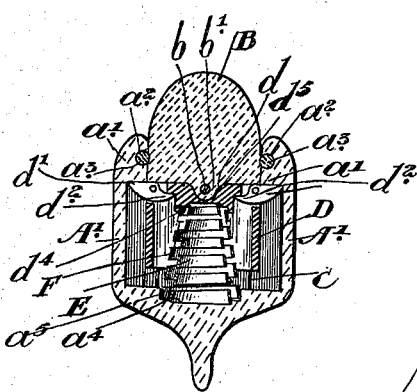
Figure 3:
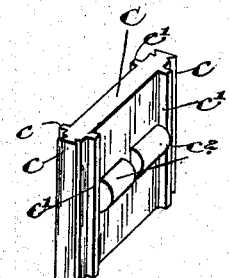
Figure 4:
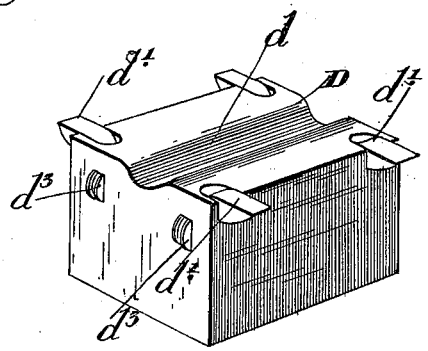

Figure 1 is a perspective view of a portion of a tire, such portion being partially in section and broken away to exhibit the construction of my invention. Fig. 2 is a cross-section through the tire and rim. Fig. 3 is a detail of the separating-walls. Fig. 4 is a detail of the rectangular cups.

In the drawings like letters of reference indicate corresponding parts in each figure.

A is the rim of the wheel, which has the upright walls A' A' and inwardly-extending lips $a'$ $a'$, with the grooves $a^2$ $a^2$, in which fit the rubber rings $a^3$ $a^3$, which extend circumferentially around the tire.

B is the outer portion of the tire, which is made, preferably, of solid rubber and fits in between the lips $a'$ $a'$, the rubber rings $a^3$ $a^3$ serving to press against the tread, so that upon the depression of the tread the space between the lips and the tread is kept watertight.

$b$ is a wire which extends through an annular projection $b'$ at the inside of the tread. The wire $b$ has its ends suitably fastened together and is preferably molded or cast in the tread.

C represents a series of intermediate walls extending from the wall A' to the wall A' and located at equal distances apart. The ends of the walls C are provided with dovetailed tongues $c$, which fit into corresponding recesses in the walls A'. The sides of the walls are provided with ribs $c'$ $c'$ for a purpose which will hereinafter appear.

$c^2$ represents rollers journaled in the walls and projecting to each side of the same beyond the ribs $c'$.

D represents rectangular cups provided with a longitudinal groove $d$ and pivoted holdfast-dogs $d'$ near each corner thereof. The holdfast-dogs $d'$ are provided with tails $d^2$, which extend underneath the base or bottom of the cup, as indicated in Fig. 2.

$d^3$ represents rollers which project through suitable slots in the end walls of the cup, such rollers being grooved rollers and designed to have reciprocating movement upon the ribs $c'$ of the walls C, as will hereinafter appear.

E is a helical spring of flat coils and with the narrower portion outermost, the ends of the spring fitting into a recess $a^4$ in the rim and a recess $d^4$ in the projecting portion of the bottom of the cup.

F is a helical spring of heavier form of coil, which encircles the spring E and fits at the inner end in the recess $a^5$ in the rim and at the outer end in the enlarged recess $d^5$, surrounding the recess $d^4$.

The projecting portion $b'$ of the tread B fits into the groove $d$ of the cup D, and thereby retains such cup centrally in position under the tread. The dogs $d'$, hereinbefore mentioned, allow of the tread to be pressed down, but in their outward movement prevent the inner face of such tread from passing beyond the inner face of the lips $a'$, and thereby hold such tread from lateral displacement.

The operation and utility of my tread are as follows: As the contacting portion of the tread passes over the ground such tread will necessarily recede against the pressure of the springs E and F, the force of one of which supplements that of the other, depending on the weight carried by the wheel. The cups D, supporting the tread, serve to preserve the contour of the tread circumferentially, and the friction in the outward and inward movement of such cups is minimized by the rollers $c^2$ and $d^3$. $d^4$ represents cushion-strips of rubber against which the cups strike when the tread contracts. It will thus be seen that the action of the tread in receding under the weight at the contacting-point with the ground is very quick and resilient. The tread is prevented from lateral displacement and a very strong tire and rim is produced, in which all pneumatic devices are dispensed with.

What I claim as my invention is—

1. In a tire for vehicles, the combination with the rim having side walls forming a channel, of a tread located between said side walls, and bodily movable inwardly between said side walls and side rings fitting in grooves in one of said parts and contacting with the abutting surfaces of the other part, substantially as described.

2. In a tire for vehicles, the combination with the rim having side walls forming a channel, of a tread fitting between the outer portions of the side walls and having an annular projection and a circumferential wire extending through the same, a plurality of cups extending circumferentially under the tread and between it and the rim and spring means for holding such cups against the under side of the tread as and for the purpose specified.

3. In a tire for vehicles, the combination with the rim having side walls forming a channel, of a tread fitting between the outer portions of the side walls and having an annular projection and a circumferential wire extending through the same, a plurality of cups extending circumferentially under the tread and between it and the rim, cross-walls provided with rollers and ribs against which the end walls of the cup and rollers therein respectively operate upon the inward and outward movement of the cups and spring means for holding such cups against the under side of the tread as and for the purpose specified.

4. In a tire for vehicles, the combination with the rim having side walls forming a channel, of a tread fitting between the outer portions of the side walls and having an annular projection and a circumferential wire extending through the same, a plurality of cups extending circumferentially under the tread and between it and the rim, and helical springs located one inside the other within each cup and having the ends thereof fitting in recesses in the base of the cup and the base of the rim opposite the cups as and for the purpose specified.

5. In a tire for vehicles, the combination with the rim having side walls forming a channel, of a tread fitting between the outer portions of the side walls and having an annular projection and a circumferential wire extending through the same, a plurality of cups extending circumferentially under the tread and between it and the rim, cross-walls provided with rollers and ribs against which the end walls of the cup and rollers therein respectively operate upon the inward and outward movement of the cups and helical springs located one inside the other within each cup and having the ends thereof fitting in recesses in the base of the cup and the base of the rim opposite the cups as and for the purpose specified.

6. In a tire for vehicles, the combination with the rim having side walls and outer lips forming a channel, of a tread fitting between the outer portions of the side walls, a plurality of cups extending circumferentially under the tread and between it and the rim and pivoted dogs having the outer ends designed to extend under the lips and the inner ends underneath the bottom of the cups and spring means for holding such cups against the under side of the tread as and for the purpose specified.

CHARLES LEWIS HENDERSON.

Witnesses:
C. BITZER,
BLANCHE I. FREEMAN.